(12) United States Patent
Godoy et al.

(10) Patent No.: US 6,805,016 B1
(45) Date of Patent: Oct. 19, 2004

(54) SENSING ASSEMBLY REMOVABLY SECURABLE TO A BEARING MECHANISM

(75) Inventors: Arquimedes Godoy, Chihuahua (MX); Aida I. Parada, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 10/396,876

(22) Filed: Mar. 24, 2003

(51) Int. Cl.$^7$ .............................................. G01D 21/00
(52) U.S. Cl. ...................... 73/866.5; 73/865.9; 33/517; 384/448; 324/174
(58) Field of Search ........................... 73/865.9, 9, 493, 73/494, 866.5; 33/517; 384/448; 374/153, 141; 324/207.25, 173, 174

(56) References Cited

U.S. PATENT DOCUMENTS

| | | | |
|---|---|---|---|
| 1,206,202 A | * 11/1916 | Bright | 33/544.6 |
| 3,005,265 A | * 10/1961 | Martin, Jr. et al. | 33/517 |
| 4,248,098 A | * 2/1981 | Sawayama et al. | 73/861.24 |
| 4,940,936 A | * 7/1990 | Grillo et al. | 324/174 |
| 5,585,577 A | * 12/1996 | Lemoine et al. | 73/866.5 |
| 5,805,080 A | * 9/1998 | Lemoine et al. | 340/870.16 |
| 6,538,429 B2 | 3/2003 | Schroeder et al. | |
| 6,546,780 B1 | 4/2003 | Palfenier et al. | |
| 6,554,318 B2 | 4/2003 | Kohut et al. | |
| 6,564,631 B1 | 5/2003 | Lake et al. | |
| 6,588,931 B2 | 7/2003 | Betzner et al. | |
| 6,604,429 B1 | 8/2003 | Pitzer | |
| 6,619,129 B2 | 9/2003 | Pitzer | |
| 6,639,399 B2 | 10/2003 | Schroeder et al. | |

* cited by examiner

Primary Examiner—Hezron Williams
Assistant Examiner—Katina Wilson
(74) Attorney, Agent, or Firm—Jimmy L. Funke

(57) ABSTRACT

A sensing assembly senses varying parameters of a bearing mechanism. The bearing mechanism includes a circular bearing housing. The sensing assembly includes a sensor case. The sensor case is fixedly secured to the bearing mechanism. The sensor case includes a peripheral surface and a top plate with extensions protruding outwardly therefrom. The sensing assembly also includes a sensor housing that is removably insertable into the sensor case. The sensor housing selectively engages the extensions of the sensor case to secure the sensor housing in the sensor case at a location spaced from the bearing mechanism. The sensing assembly includes a sensor that is disposed within the sensor housing. The sensor senses the parameters of the bearing mechanism, wherein the sensor and the sensor housing may be removed from the bearing mechanism and replaced without replacing the bearing mechanism. The extensions may be bosses that have channels allowing heat stakes to extend therethrough or, in an alternative arrangement, the extensions may be notches that receive latches therein to removably lock the sensor in place.

13 Claims, 2 Drawing Sheets

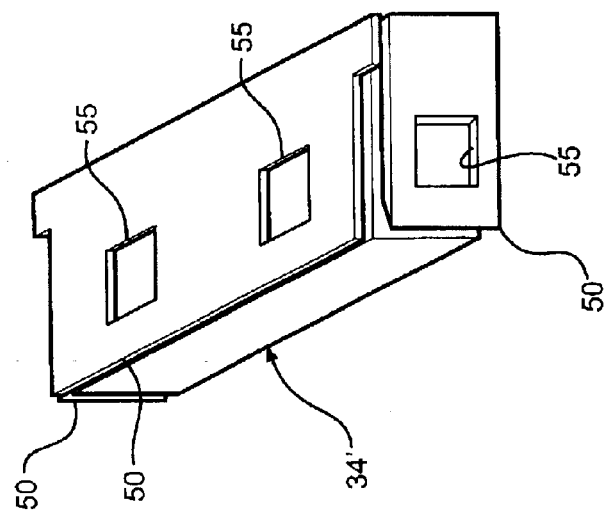
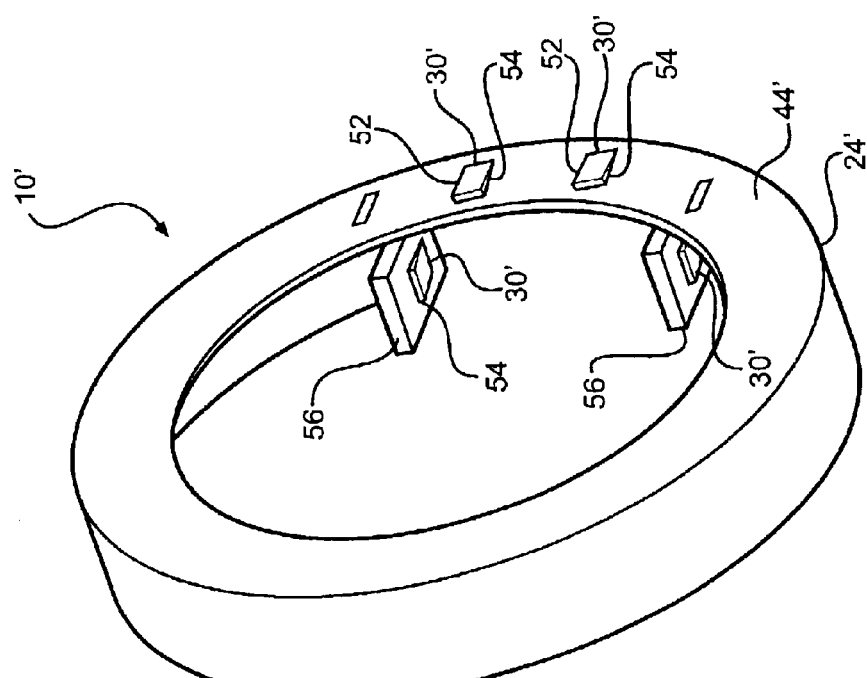

SENSING ASSEMBLY REMOVABLY SECURABLE TO A BEARING MECHANISM

BACKGROUND ART

1. Field of the Invention

The invention relates to sensing assemblies for bearing mechanisms. More particularly, the invention relates to sensing assemblies capable of being removed from the bearing mechanism without removing or replacing the bearing mechanism prior to the end of the life of the bearing mechanism.

2. Description of the Related Art

Sensing assemblies are used with bearing mechanisms to measure various parameters, such as rotational speed, vibrations, temperature, and the like. Bearing mechanisms are used in hostile environments to facilitate the rotation of one part with respect to another. Typically, the parts include a rotating shaft or wheel.

When one part is rotating with respect to another, it is oftentimes desired to know parameters of the bearing mechanism. This will provide information about the condition of the rotating assembly and the necessity of repair. If a part is rotating at a slower rate, it could be determined that the bearing is failing and is in need of repair or replacement.

Because the bearing mechanisms are in a harsh environment, sensors operating in conjunction with the bearing mechanisms tend to fail quickly. Currently, the design of many bearing mechanisms and sensors requires the bearing and the sensor assembly to be replaced. This is required because the sensor is integrally manufactured with the bearing mechanism. Such wholesale replacement of the bearing mechanism when the sensor fails creates a very high cost for sensor failure.

There are serviceable sensors that may be replaced without the replacement of the bearing mechanism. These systems require a bore hole to be drilled into a bearing surface. A probe is inserted into the drilled hole. This design is not appropriate for many situations, especially when the bearing steel has an elevated hardness. Bolting sensors to bearing mechanisms is also less desirable due to the tendency for the bolts to oxidize prior to the end of the life of the sensor assembly.

SUMMARY OF THE INVENTION

A sensing assembly senses varying parameters of a bearing mechanism. The bearing mechanism includes a circular bearing housing. The sensing assembly includes a sensor case. The sensor case is fixedly secured to the bearing mechanism. The sensor case includes a peripheral surface and a top plate with extensions protruding outwardly therefrom. The sensing assembly also includes a sensor housing that is removably insertable into the sensor case. The sensor housing selectively engages the extensions of the sensor case to secure the sensor housing in the sensor case at a location spaced from the bearing mechanism. The sensing assembly includes a sensor that is disposed within the sensor housing. The sensor senses the parameters of the bearing mechanism, wherein the sensor and the sensor housing may be removed from the bearing mechanism and replaced without replacing the bearing mechanism.

BRIEF DESCRIPTION OF THE DRAWINGS

Advantages of the invention will be readily appreciated as the same becomes better understood by reference to the following detailed description when considered in connection with the accompanying drawings, wherein:

FIG. 3 is a perspective view of a second embodiment of the sensor case; and

FIG. 4 is a perspective view of a second embodiment of the sensor housing.

DETAILED DESCRIPTION OF THE PREFERRED EMBODIMENT

Figure 1:
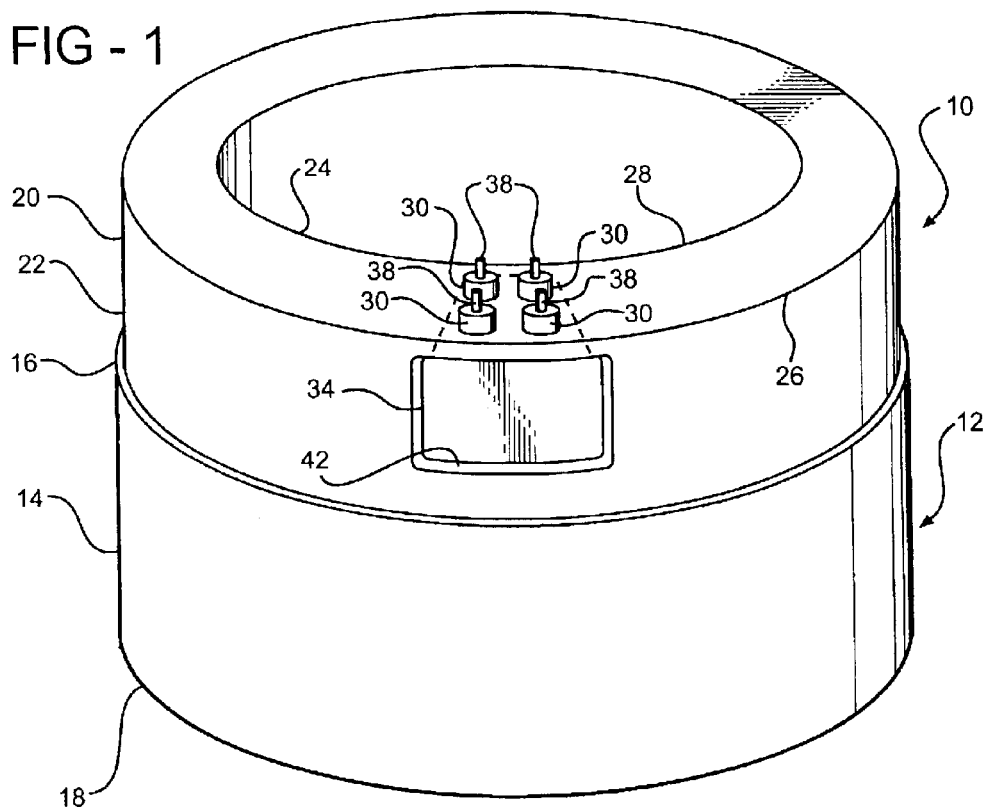
FIG. 1 is a perspective view of one embodiment of the invention secured to a bearing mechanism.

Referring to FIG. 1, one embodiment of the invention is generally indicated at 10. The invention is a sensing assembly 10 that is fixedly secured to a bearing mechanism 12. The bearing mechanism, generally shown at 12 (the "bearing 12") is shown having a circular bearing housing 14 extending between an upper end 16 and a lower end 18. The bearing housing 14 houses a mechanism that aids in one part rotating with respect to another (none shown). When the rotating part rotates, the bearing 12 has parts that move therewith. Should these parts bind, the rotation of the rotating part is significantly reduced and may fail. Rotational speed and temperature of the bearing 12 are two parameters that can be measured to identify the condition of the bearing 12.

The sensing assembly 10 senses the parameters of the bearing 12 to ensure the bearing 12 is operating as designed. The sensing assembly 10 includes a sensor case 20 that is fixedly secured to the bearing 12. The sensor case 20 is fixedly secured to the upper end 16 of the bearing 12. The sensor case 20 includes a peripheral surface 22. The peripheral surface 22 is circular in shape and extends along a periphery substantially similar to the circular bearing housing 14. As is shown in FIG. 1, the peripheral surface 22 may have a periphery slightly different than the circular bearing housing 14.

The sensor case 20 also includes a top plate 24. The top plate 24 extends around the peripheral surface 22. More specifically, the outer diameter of the top plate 24 defines an edge 26 that is also the upper edge of the peripheral surface 22. The top plate 24 has an inner edge 28 that defines an inner diameter that is greater than the rotating part that would extend through the hole created by the top plate 24 once assembled.

The sensor case 20 also includes extensions 30 protruding outwardly from the top plate 24. The extensions 30 resemble bosses and include a channel 32 that extend the entire length of each of the extensions 30. In the embodiment shown in FIG. 1, four extensions 30 extend through the top of the top plate 24.

The sensing assembly 10 includes a sensor housing 34. The sensor housing 34 is removably inserted into the sensor case 20 where it is positioned appropriately for the sensor 36 housed therein. The sensor 36 is shown in phantom in FIG. 2. The sensor 36 senses the desired parameter of the bearing 12 to ensure its operating properly.

Figure 2:
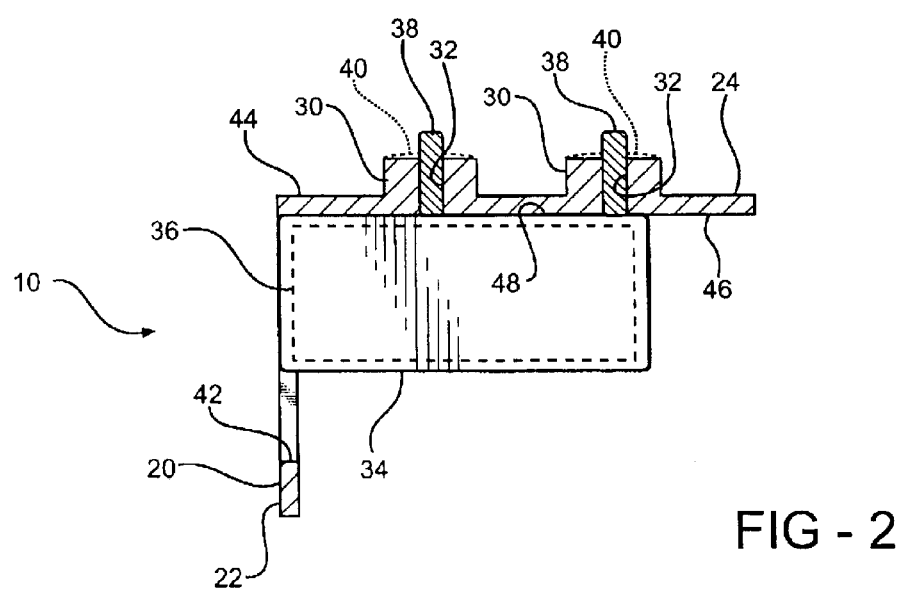
FIG. 2 is cross-sectional side view of the sensor housing attached to a sensor case using one embodiment of the invention.

The sensor housing 34 selectively engages the extensions 30 to maintain its proper position with respect to the bearing 12. The sensor housing 34 interacts with the extensions 30 using heat stakes 38. The heat stakes 38 are shown in FIGS. 1 and 2 before they are melted by thermal energy. The heat stakes 38 arc inserted into the channels 32 of the extensions 30 and pushed therethrough until they abut the sensor housing 34. Once inserted, the heat stakes 38 are heated until they melt. Phantom lines 40 in FIG. 2 represent the heat stakes 38 after they are melted. After melted, the heat stakes 38 seep between the top plate 24 and the sensor housing 34. Upon the curing of the melted material, the sensor housing 34 is secured in place.

To remove the sensor housing 34 so that the sensor 36 may be replaced, the melted material 40 is drilled through and broken up allowing the sensor housing 34 to be removed through a housing window 40.

Returning attention to FIG. 2 and the top plate 24, the top plate 24 includes an outward surface 44 and an inward surface 46. In the orientation of FIG. 2, the outward surface 44 is directed upwardly and the inward surface 46 is directed downwardly. The sensor housing 34 includes an upper housing surface 48 that abuts a portion of the inward surface 46 of top plate 24 of the sensor case 20. It is between the upper housing surface 48 and the inward surface 46 that the melted heat stakes 38 extend before it cures and hardens securing the sensing housing 34 to the sensing case 20.

Referring to FIGS. 3 and 4, a second embodiment is shown wherein primed reference characters represent elements similar to those in the first embodiment. The sensing assembly 10' does not include the use of the heat stakes 38. Instead, the sensor housing 34' is held in place with receptors 50. In the embodiment shown, the receptors are latches 50 that engage the extensions 30', which are notches 30' extending outwardly from the outward surface 44' of the top plate 24'.

The notches 30' include a ramp surface 52. The ramp surface 52 is engaged by the latches 50 and allows the latches 50 to ride therealong until a step 54 locks the latches 50 in place. More specifically, each of the latches 50 includes at least one opening 55 that receives the notches 30' therein. The engagement between each of the latches 50 and the steps 54, commonly referred to as a snap fit, prevent the sensor housing 34' from moving away from the sensor case 20'. The locking engagement is released when all of the notches 30' are pressed downwardly forcing the latches 50 out of the steps 54. This allows the sensor and sensor housing 34' to be replaced without replacing the bearing 12'.

The second embodiment of the sensing assembly 10' also includes guide plates 56 that extend inwardly from the peripheral surface 22'. The guide plates 56 guide the sensor housing 34' as the sensor housing 34' is moved into and out of position. The guide plates 56 also include notches 30'. The sensor housing 34' includes latches 50 along the sides that engage the ramp surfaces 52 of the notches 30' to help lock the sensor housing 34' in place. The steps 54 on the guide plates 56 are oriented in an opposite direction than the steps 54 on the top plate 24' to ensure the sensor housing 34' is held in place.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A sensing assembly for sensing parameters of a bearing mechanism including a circular bearing housing, said sensing assembly comprising:

a sensor case fixedly secured to the bearing mechanism, said sensor case including a peripheral surface and a top plate with extensions protruding outwardly therefrom, said top plate defining an outward surface and an inward surface;

a sensor housing having an upper housing surface abuttable with a portion of said inward surface of said sensor case removably insertable into said sensor case, said sensor housing selectively engaging said extensions of said sensor case to secure said sensor housing in said sensor case at a location spaced from the bearing mechanism;

a sensor disposed within said sensor housing to sense the parameters of the bearing mechanism wherein said sensor and said sensor housing may be removed from the bearing mechanism and replaced without replacing the bearing mechanism; and guide plates extending inwardly from said peripheral surface to guide said sensor housing as said sensor housing moves into and out of said sensor case.

2. A sensing assembly as set forth in claim 1 wherein said sensor housing includes a plurality of latches engagable with said extensions of said sensor case to lock said sensor housing to said sensor case.

3. A sensing assembly as set forth in claim 2 wherein said extensions include notches for selectively engaging each of said plurality of latches.

4. A sensing assembly as set forth in claim 3 wherein said extensions extend outwardly from said outward surface of said top plate.

5. A sensing assembly as set forth in claim 1 wherein each of said extensions includes a channel extending therethrough.

6. A sensing assembly as set forth in claim 5 including a heat stake insertable into each of said channels of each of said extensions, each of said heat stakes bondable with said sensor housing and said sensor case.

7. A method for removably securing a sensing assembly to a bearing mechanism, said sensing assembly having a sensor inside a sensor housing having a plurality of extensions protruding out therefrom and a sensor case, the method comprising the steps of:

fixedly securing the sensor case to the bearing mechanism coaxially therewith;

inserting the sensor into the sensor housing;

inserting the sensor housing into the sensor case; and removably securing the sensor housing to the sensor case allowing the sensor housing and the sensor to be removed from the bearing mechanism prior to replacing the bearing mechanism by latching the sensor housing to the extensions extending out of the sensor case.

8. A method as set forth in claim 7 wherein the step of latching includes the step of securing a plurality of latches over the extensions of the sensor case.

9. A method as set forth in claim 8 wherein the step of removably securing the sensor includes the step of heat staking the sensor housing to the extensions extending out of the sensor case.

10. A method as set forth in claim 9 wherein the step of heat staking includes the step of inserting a heal stake into each of the plurality of extensions.

11. A method as set forth in claim 10 wherein the step of heat staking further includes the step of applying heat to each of the plurality of heat stakes.

12. A sensing assembly for sensing parameters of a bearing mechanism including a circular bearing housing, said sensing assembly comprising:

a sensor case fixedly secured to the bearing mechanism, said sensor case including a peripheral surface and a top plate with extensions protruding outwardly therefrom;

a sensor housing removably insertable into said sensor case, said sensor housing including receptors for selectively engaging said extensions of said sensor case to secure said sensor housing in said sensor case at a location spaced from the bearing mechanism, said receptors including a plurality of latches engagable with said extensions of said sensor case to lock said sensor housing to said sensor case; and a sensor disposed within said sensor housing to sense the parameters of the bearing mechanism wherein said sensor and said sensor housing may be removed from the bearing mechanism and replaced without replacing the bearing mechanism.

13. A sensing assembly as set forth in claim 12 wherein said extensions include notches for selectively engaging each of said plurality of latches.

* * * * *